United States Patent
Timus

(10) Patent No.: US 7,580,362 B2
(45) Date of Patent: Aug. 25, 2009

(54) SYSTEM AND METHOD FOR REPORTING MEASUREMENTS IN COMMUNICATION SYSTEM

(75) Inventor: Bogdan Timus, Sundbyberg (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 423 days.

(21) Appl. No.: 10/572,372

(22) PCT Filed: Sep. 30, 2003

(86) PCT No.: PCT/SE03/01515

§ 371 (c)(1),
(2), (4) Date: Mar. 16, 2006

(87) PCT Pub. No.: WO2005/032185

PCT Pub. Date: Apr. 7, 2005

(65) Prior Publication Data

US 2007/0081468 A1    Apr. 12, 2007

(51) Int. Cl.
*H04J 1/16*    (2006.01)
*H04L 12/28*    (2006.01)

(52) U.S. Cl. ...................................... 370/252; 370/254

(58) Field of Classification Search .................. 370/235, 370/335, 230, 331, 338, 349, 341, 332, 348, 370/342, 441, 466, 467, 468, 469, 476, 465, 370/395.42, 395.21; 455/509, 452.2, 450, 455/423, 436, 437, 403, 439, 442, 453

See application file for complete search history.

(56) References Cited

U.S. PATENT DOCUMENTS

| | | | |
|---|---|---|---|
| 6,445,917 B1 | 9/2002 | Bark et al. | |
| 6,473,624 B1 | 10/2002 | Corbett et al. | |
| 6,564,067 B1 * | 5/2003 | Agin | ........................ 455/522 |
| 6,600,933 B1 * | 7/2003 | Hiramatsu et al. | .......... 455/561 |

FOREIGN PATENT DOCUMENTS

| | | |
|---|---|---|
| WO | 00/76233 A1 | 12/2000 |
| WO | 02/073887 A2 | 9/2002 |

OTHER PUBLICATIONS

International Search Report of PCT/SE2003/001515, mailed Apr. 1, 2004.
Translation of Chinese official action, May 15, 2009, in corresponding Chinese Application No. 03827125.7.

* cited by examiner

*Primary Examiner*—Melody Mehrpour
(74) *Attorney, Agent, or Firm*—Nixon & Vanderhye P.C.

(57) ABSTRACT

A system, method and control unit are described for controlling the periodic reporting of measurements in a communication system from an access point to a control unit over a control interface. The measurements are used by algorithms in the control unit for controlling resource allocation at the access point. The reporting of measurements is controlled by dynamically determining a frequency for periodic reporting of each periodic measurement report from the access point to the control unit based on information on a number of links currently handled by the access point and such that a total aggregate frequency of periodical reporting of the number of periodic measurement reports does not exceed the limited total capacity of the control interface.

29 Claims, 5 Drawing Sheets

SYSTEM AND METHOD FOR REPORTING MEASUREMENTS IN COMMUNICATION SYSTEM

This application is the US national phase of international application PCT/SE2003/001515, filed 30 Sep. 2003, which designated the U.S., the entire content of which is hereby incorporated by reference.

FIELD OF THE INVENTION

The present invention relates to communication systems and methods, and more particularly, it relates to systems and methods for controlling the communication of measurement reports between an access point and a control unit in a communication system.

BACKGROUND OF THE INVENTION

In a communication system, the role of a control unit is, among other things to control the resource allocation at access points connected to the control unit. In order to be able to perform this task, the control unit requests, from the access points, measurement reports containing measurements regarding links associated with the access points, measurements which are necessary for e.g. being able to control the resource allocation at the access points. The measurement reports are evaluated in the control unit, and based on the evaluation, commands are sent from the control unit to the access points.

As an example of such a communication system, FIG. 1 shows an exemplary mobile communication system 100. It comprises mobile terminals 101 in contact with access points 103 via links 102 over an access interface, which for the exemplary mobile communication system is an air interface. For the mobile communication network, the geographical position of the terminal defines to which access point the terminal is presently in contact. Each terminal 101 is in contact with its access point 103 via at least one link 102. The access points are in their turn connected via control interfaces 104 to a control unit 105. The control interface 104 is defined as a connection between one control unit 105 and one access point 103. In FIG. 1, for clarity reasons, only one control unit 105, one access point 103 and consequently only one control interface 104 is shown, although, it would be apparent to a person skilled in the art that a communication system may comprise many control units, access points and control interfaces.

As mentioned above, the control unit 105 controls the resource allocation at the access point 103 connected to the control unit. This control is managed by algorithms in subunits 205, 206 in the control unit 105. For this purpose, the control unit requests measurement information from the access point 103 regarding the links 102 associated with the access point 103. The measurements could be of different types depending on what is requested by the algorithms. In the example of a mobile communication system, the measurement types could be e.g.: received interference level, transmitted power level, path-loss, received signal quality, etc.

A common practice is that each subunit 205, 206 in the control unit 105 requests its own measurements necessary for its algorithm from the access point 103 on a per link basis. The measurement requests, sent by the control unit 105, specify the type of measurements to send and with which frequency they should be sent. In response, the access point 103 compiles so called periodic measurement reports, which are sent to the subunits 205, 206 in the control unit 105 at the requested frequency comprising the requested measurements. Different types of periodic measurement reports could be sent at different frequencies depending on what is being reported.

The measurement reports are necessary for the system to know e.g. the quality of a link 102 and to be able to take necessary steps if for example the quality of a link deteriorates. Such steps could e.g. be that the mobile communication network performs handover of a terminal 101 to another access point 103. Therefore, the more often measurement reports are received at the control unit 105 for evaluation, the better the control of the communication over each link 102. On the other hand, there are capacity limitations over the control interface 104 and in the processors in the access point 103 that limits the amount of measurement reports that could be sent to the control unit 105 over the control interface 104.

As the different subunits 205, 206 in the control unit requests their own measurement reports from the access point 103 and as the algorithms in the subunits may request reports comprising different measurement types for one link, an access point may have to send more than one periodic measurement report per link. Therefore, and especially since an access point 103 may accommodate e.g. 100 links, the total number of different possible periodic measurement reports may become quite large over one control interface 104. Since at the same time, as described above, there are capacity limitations regarding the amount of measurement reports possible to send to the control unit 105 over the control interface 104, there is a need to control the reporting frequency of the periodic measurement reports sent over the control interface.

The international patent application WO 00/76233 shows a prior art system for controlling the communication of measurement reports in a mobile communication system. It deals with limiting the number of measurement reports sent from a terminal 101 over a link 102 in the access interface to the access point 103 that the terminal 101 is connected to.

The international patent application WO 02/73887 shows another prior art system for controlling the communication of measurement reports within a mobile communication system. This document deals with the problem of having limited resources in the processor in the access point 103. The load of the processor is controlled by controlling the reporting of measurements within the access point 103.

None of the prior art documents discuss controlling the communication of measurement reports from an access point to a control unit considering the request sent by the control unit.

As could be seen above, there is a need for a system for efficiently controlling the communication of measurement reports from an access point 103 over a control interface 104 to a control unit 105.

SUMMARY OF THE INVENTION

As mentioned above, in communication networks a control unit requests periodic measurement reports from an access point over a control interface. The reported periodic measurement reports comprises measurements regarding links associated with the access point. For controlling purposes there is an interest for a control unit to receive these measurement reports frequently. However, the capacity for forwarding measurement reports over the control interface is limited.

The object of the invention is to control the measurement reporting from the access point to the control unit over the control interface such that the limited capacity over the control interface is efficiently used for the purpose of achieving a good control of the resource allocation at the access point.

The above stated object is achieved by means of a method according to claim 1, a communication system according to claim 14, a computer program product according to claim 28 and a control unit according to claim 29.

The present invention makes it possible to efficiently control the measurement reporting from an access point to a control unit over a control interface having limited capacity, by dynamically determining the reporting frequencies of the periodic measurement reports over the control interface based on information on the currently requested periodic measurement reports of the links currently handled by the access point and the limited capacity of the control interface.

According to a preferred embodiment of the invention, the methods, systems, computer program products and control units of the invention are arranged to dynamically determine the reporting frequencies based on the currently active links.

According to another preferred embodiment of the invention, the methods, systems, computer program products and control units of the invention are arranged to dynamically determine the reporting frequencies based on the content of the periodic measurement reports regarding the currently active links.

An advantage of the present invention is that since the usage of the capacity of the control interface is dynamically evaluated and compared to the total capacity of the control interface, a high amount of the total capacity of the control interface could be constantly used and the control point will receive at times a higher amount of reports compared to prior art, which will result in an improved performance of the system.

A further advantage of the present invention is that the capacity of the control interface would be more efficiently used compared to prior art by adapting the reporting frequencies of the periodic measurement reports to the current load of the control interface.

As a result of the more efficient use of the capacity of the control interface, the resource allocation in the access point could be improved and, thereby, the performance of the system could also be improved.

Another advantage according to one aspect of the invention is that the invention is easy and cheap to implement in the system since it only requires adaptations in the control unit. The invention could be implemented by introducing a novel subunit, a so called measurement proxy in the control unit. This novel subunit could be either a piece of hardware or a computer-program product to be executed by hardware that already exists in the control unit. Furthermore, the present invention does not require any changes in the implementation in the control unit of the algorithms that use the measurements.

Yet another advantage of the present invention is that no changes are required to the concerned standards.

Another advantage of embodiments of the present invention is that the performance of the system could be further improved by adapting the frequencies of the periodic reporting of the different measurement reports to the contribution of the different measurement reports to the total performance of the system. Thus measurement reports having a great impact on system performance may be reported with a higher frequency than measurement reports with little impact on system performance.

Yet another advantage according to another embodiment of the invention is that reports can be received with different frequencies at the subunits in the control unit compared to the frequencies used over the control interface between the access point and the input of the control unit. This is for example advantageous when two or more subunits request the same measurement reports but with different frequencies. The sending of redundant measurement reports can then be avoided over the control interface by coordinating reporting to the different subunits. Thereby, the capacity of the control interface will be used even more efficiently.

A further advantage according to one embodiment of the invention is that the measurement proxy implemented in the control unit acts as a traffic flow control over the control interface and thereby a congestion of both the reporting processor in the access point and the control interface is avoided.

Further advantages of embodiments of the present invention will become apparent when reading the following detailed description in conjunction with the drawings.

DETAILED DESCRIPTION

Figure 1:
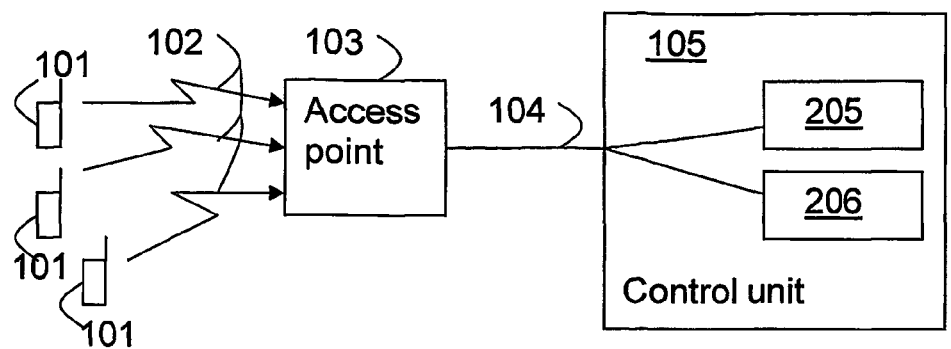
FIG. 1 shows a schematic block diagram of a communication system wherein the present invention may be used.

The present invention will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like numbers refer to like elements.

The present invention may be used in the exemplary communication system illustrated in FIG. 1. This communication system comprises, among other things, an access point 103, a control unit 105 and a control interface 104 connecting the access point 103 to the control unit 105. The access point 103 is arranged to give access to a network (not shown in FIG. 1) via links 102. A number of terminals 101 can be connected via the links 102 and the access point 103 to the network. Each terminal 101 is in contact with its access point 103 via at least one link 102. In FIG. 1 for clarity reasons only one control unit, one access point and consequently only one control interface 104 is shown, although, a person skilled in the art would know that a communication system can comprise many control units, access points and control interfaces.

The links 102 are allocated a certain amount of network resources for the communication to and from the terminals 101. Since it may be advantageous for the system performance to allocate different amounts of resources to the links depending on characteristics of the links, a task of the control unit 105 is to control this resource allocation at the access point 103. When allocating resources, the control unit 105 may also consider the user data traffic, whether the terminal or the user data flow associated with a link 102 has some associated priority and, if so, how high this priority is with respect to the priority of other terminals or user data flows. This control is managed by algorithms residing in subunits 205, 206 in the control unit 105. For this purpose, the control unit 105 requests measurement information from the access point 103 regarding the links 102 handled by the access point. The measurements could be of different types depending on what is requested by the algorithms. In the example of a mobile communication system, the measurement types could be e.g.: received interference level, transmitted power level, pathloss, received signal quality, etc. The access point 103 responds to the requests from the control unit by sending measurement reports over the control interface 104 to the subunits 205, 206 in the control unit. The measurement requests, sent by the control unit 105, specify the type of measurements to be compiled into measurement reports, and for periodic measurement reports the requests also specify with which frequencies the periodic measurement reports should be sent to the control unit. In response, the access point 103 compiles and sends periodic measurement reports at the requested frequencies.

Different measurement reports may contain different types of measurements. Therefore, the access point 103 may send several periodic measurement reports for each link. Furthermore, different algorithms may require the same measurement type from the same links.

As earlier described in the background section, higher measurement reporting frequencies could lead to a higher performance of the communication system. Although, due to capacity limitations over the control interface 104 there are limitations on the number of measurement reports that can be sent per time unit from the access point 103 to the control unit 105. The capacity limitations over the control interface 104 can be due to a limited bandwidth of the control interface, but also due to limited processing capacity in the access point 103 for the reporting purposes. With the expression capacity limitations over the control interface is here meant any cause for limiting the number of reports that could be sent from the access point 103 to the control unit 105 per time unit. Consequently, for improving the performance of the system there is a need to control the periodic measurement reporting frequencies with regard to the limitations of the control interface.

According to the invention, a frequency for periodical reporting of each periodic measurement report from the access point to the control unit is dynamically determined based on information on the number of links currently handled by the access point and such that a total aggregate frequency of periodic measurement reports does not exceed the limited total capacity of the control interface.

For example, if the number of links handled by the access point decreases, it will be possible to increase the frequency for periodical reporting of each measurement report as long as the total aggregate reporting frequency does not exceed the total capacity of the interface.

In the prior art solution for controlling the communication of measurement reports in a communication system described in the international patent application WO 00/76233 mentioned above, there is no control or supervision of the total current use of any interface compared to the total capacity of the interface. The control takes into account only one link at a time, i.e. with no respect to the reporting frequency on the other links, to the aggregate reporting frequency or to the total capacity of the interface. However, the solution according to the present invention determines suitable reporting frequencies with regard to the limitations of the control interface and with regard to information on the links currently handled by the access point, which allows for instant determination of suitable reporting frequencies for all requested periodic reports taking into account the total capacity of the interface. As a result, the present solution gives an improved interface use and better system performance compared to the prior art solution.

In some communication systems, the request issued by the control unit 105 is standardised, which means that the access point 103 must comply with the request. According to such a standard, exemplified by the 3GPP standard document TS 25.433, the access point 103 may answer to such a request by a "measurement failure response", but it is not allowed to change on its own the requested reporting frequency. Therefore a solution based exclusively on logics located in the access point 103, i.e. according to which the access point 103 decides on its own when and to which new reporting frequency to switch, will not be compliant with such a standard.

Measurements for different links and/or different measurement types contribute in different degrees to the performance of the communication system 105. For example, for a mobile communication system it is important to control the total power used by the active links in a cell or access point for a good total performance of the system, because the total power of an access point is limited due to limited power amplifier resources etc. It is therefore important for the control unit to allocate and reallocate resources so that the total power does not increase too much. Then it is more important to control and get accurate measurements for links using high code power than to control links using low code power because high code power links use more of the total radio resources in a cell and have a larger absolute variation in power. This is especially true for a UMTS-like system since the power control is adjusted in logarithmic steps and an increase with 1 dB leads to a larger absolute increase if the current code power is high than if the code power is low. Thus, to more often control the links having high code power would contribute in a higher degree to the total performance of the system. Therefore, according to a first preferred embodiment of the invention, the measurement requests sent by the control unit 105 can configure the reporting procedure in the access point 103 in such a way that the access point 103 can utilise different reporting frequencies $f_{i,j}$, for each periodic measurement report for each link i and for each measurement type j depending on the importance of the information in each periodic measurement report. By taking the limitations of the control interface and the importance of each periodic measurement report into account when setting the reporting frequencies $f_{i,j}$, the performance of the system may be further improved.

According to the first embodiment of the idea, the reporting frequencies $f_{i,j}$ are dynamically computed by the control unit 105, based on the total capacity F of the control interface 104 and on a set of dynamically changing weighting coefficients $w_{i,j}$ associated with each link i and each measurement type j. Each time the set of reporting frequencies changes, measurement requests are sent to the access point 103 in order to update (reconfigure) the reporting procedure. The total capacity F of the control interface 104 could be known a priori or estimated by the system.

According to the first preferred embodiment, the reporting frequencies $f_{i,j}$, for the i-th link and the j-th measurement type are computed in the control unit 105 by:

$$f_{i,j} = k * w_{i,j}$$

where k is a factor dynamically computed as:

$$k \leq \frac{F}{\sum_{i,j} w_{i,j}}$$

In fact the way k is computed reflects the constrain imposed by the control interface capacity:

$$\sum_{i,j} f_{i,j} \leq F$$

i.e. that the sum of all reporting frequencies must not exceed the total capacity of the control interface.

The formulas in the paragraph above could also be expressed in a more general manner as:

$$f_r = k * w_r$$

wherein $f_r$ denotes the reporting frequency for measurement report r, $w_r$ denotes the weighting coefficient for measurement report r and wherein k is a factor dynamically computed as:

$$k \leq \frac{F}{\sum_r w_r}$$

wherein k is computed reflecting the constrain imposed by the control interface capacity:

$$\sum_r f_r \leq F$$

The new functionality described above can according to another embodiment of the invention be implemented by introducing a novel subunit in the control unit 105. The novel subunit, referred to in the following as a measurement proxy, can be either a piece of hardware or a computer-program product to be executed by hardware that already exists in the control unit 105 or a combination of a computer-program product and hardware.

Figure 2:
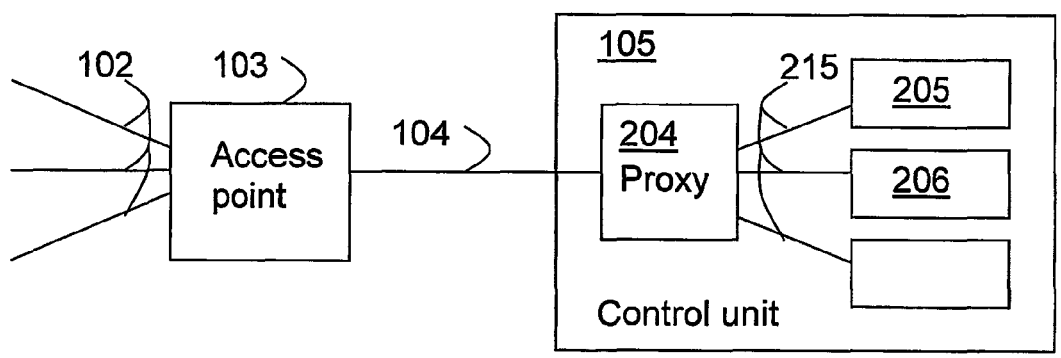
FIG. 2 is a schematic block diagram illustrating an embodiment of the present invention incorporating a proxy in the control unit for realizing the invention in a communication system.

FIG. 2 shows the implementation of a measurement proxy 204 in the control unit 103 for controlling the system according to the invention. In this figure, the terminals are not shown, but the links 102 to the terminals are shown. The measurement proxy 204 is inserted in the control unit 105 between the access point 103 and the subunits 205-206. Thereby a new interface called a subunit interface 215 is created between the measurement proxy 204 and the subunits 205, 206. The measurement proxy 204 will be able to separately control the reporting process from the access point 103 over the control interface 104 to the measurement proxy 204 from the reporting process from the proxy 204 over the subunit interface 215 within the control unit 105 to the different algorithms residing in the subunits 205, 206. Thereby the reporting frequency over the control interface 104 could be different to the reporting frequency used over the subunit interface 215, which may spare reporting resources as shown below in embodiments of the invention. In order for this to work seamlessly for both the access point 103 and especially for the subunits 205, 206, the measurement proxy 204 performs the adaptive change of the reporting frequency over the control interface 104 by emulating measurement reports over the subunit interface 215 at the reporting period requested by the subunits.

The measurement proxy can, according to a preferred embodiment of the invention, coordinate the reporting process in case several subunits 205, 206 within the control unit 105 request similar measurement reports, regarding the same measurement type or types and the same link. For example, two resource allocation algorithms, residing in the subunits 205 and 206, respectively, may require measurements regarding the transmission power on the same link 102, but where the measurements should be low-pass filtered with different filters and reported with different measurement frequencies. According to this preferred embodiment, the measurement proxy 204 within the control unit 105 can rationalise the requests issued by the two algorithms in the subunits 205, 206 and only send one measurement request to the access point 103 over the control interface 104. Then the access point 103 responds by sending only one periodic measurement report over the control interface 104 to the measurement proxy 204, which in turn emulates two different reports based on the requested different filters and sends these reports over the subunit interface 215 to the algorithms in the subunits 205, 206 at the requested different reporting frequencies.

According to another embodiment, the adaptive change of reporting frequencies according to the invention could also be implemented in the access point. This requires that the access point implicitly knows how to compute the weighting coefficients in order to improve the system performance. However, the control unit must set the weighting coefficients, for example by using the measurement proxy according to the invention, or at least provide the access point with the information needed to set the weighting coefficients. For instance since according to the current 3GPP standard TS 25.433, this information is not available in the access point and the access point must comply with the request from the control unit. Furthermore, a measurement proxy 204 is needed in the control unit in order to emulate the measurement reports needed by the subunits 205, 206 in the sense of restoring the reporting frequencies requested by the subunits 205, 206. According to this embodiment, the control unit will work in a more "asynchronous way", since it will no longer know the exact reporting frequencies. Instead, it will receive the reports in a more event-triggered fashion.

Figure 3:
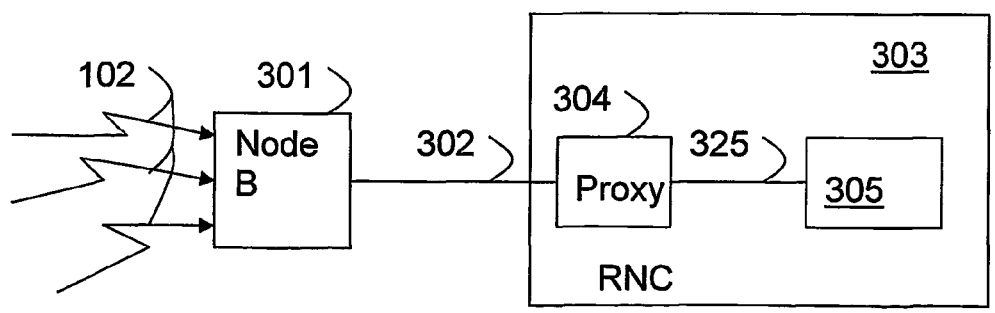
FIG. 3 is a schematic block diagram illustrating another embodiment of the present invention incorporating a proxy in the control unit for realizing the present invention in an exemplary mobile communication system working according to the UMTS standard.

FIG. 3 shows an example of a preferred embodiment of the invention implemented in a part of an exemplary UMTS Terestrial Radio Access Network (UTRAN) of a mobile communication system. The part of the exemplary UTRAN comprises a Radio Network Controller (RNC) 303 corresponding to the control unit 105 in FIG. 2, a NodeB 301 corresponding to the access point 103 in FIG. 2 and an Iub interface 302 corresponding to the control interface 104 in FIG. 2. For illustrative purposes only, in this exemplary embodiment of the invention, the RNC 303 contains only one resource allocation algorithm in one subunit 305, which algorithm uses only code power measurements in order to decide how to allocate radio resources, e.g. bit-rate control or link admission control, i.e. only one type of periodic measurement report needs to be sent per link 102. Furthermore, to illustrate the advantages of the invention, it is assumed that the resource allocation algorithm in the subunit 305 is designed to receive code power measurements with a frequency of 1.25 Hz (the figures used in this example are selected only for didactical purposes). This means that the subunit 305 expects the NodeB 301 to send a measurement report comprising code power measurements over the Iub interface 302 each 800 ms, for each link 102. Assume that the total capacity of the Iub interface 302 is 20 reports per second and that at time to the number of links in the cell is $N(t_0)=20$. Given the limited total capacity of the Iub interface 302, the maximum number of links for which a reporting frequency of 1.25 Hz can be maintained is 20/1.25=16 links, which is smaller than the current number of links. Therefore, requesting a reporting frequency of 1.25 Hz over the control interface for 20 links might cause a hazardous behaviour of the NodeB 301.

This problem is solved with the help of a measurement proxy 304 or similar in the control unit 303 working in the following way: The subunit 305 requests a reporting frequency of 1.25 Hz. However, the measurement proxy 304 sets the measurement reporting frequency over the Iub interface 302 for each link 102 that NodeB 301 is actually using according to the maximum reporting capability of the Iub interface 302. This means that the measurement reporting frequency for each link over the Iub interface 302 can be both larger or smaller than 1.25 Hz, depending on the number of links used for the moment and on the total capacity of the Iub interface 302. In the example above, since the number of links in the cell at to was 20 and the total capacity of the Iub interface 302 was 20 reports per second, the mean reporting frequency over the Iub interface 302 would be 1 Hz.

The proxy 304 maintains a monitor (estimate) for each link. This monitor is updated each time a measurement report is received from NodeB 301. Based on this monitor, the proxy 304 will emulate measurement reports and send them to the subunit 305 over a subunit interface 325 at the frequency requested by the resource allocation algorithm in the subunit 305, in the example above 1.25 Hz. In this way, the subunit 305 will receive measurement reports at the requested frequency over the subunit interface 325 even if a different reporting frequency may be used over the Iub interface 302. Consequently, the subunit 305 does not need to be aware of the existence of the measurement proxy 304, and the signalling protocol used over the subunit interface 325 is the same as the protocol used over the Iub interface 302 according to the 3GPP standard document "UTRAN Iub interface NBAP Signalling", 3GPP TS 25.433.

The exact procedure performed by the measurement proxy 304 is exemplified by the following example, using the numeric examples from above. In this example, all links 102 are supposed to contribute evenly to the system performance, i.e. they have been given the same weight:

$w_i=w=1$ which means that the reporting frequencies at a given moment are the same on all the links:

$f_i=f=F/N$ where N is the number of links in the cell. Then the reporting frequency f will be set to $f(t_0)=20/20=1$ Hz (i.e. one report per second for each link). If, at a later moment $t_1$, the number of links 102 connected to the NodeB 301 decreases to for example $N(t_1)=10$ (e.g. as a result of decreased number of terminals handled by NodeB), the reporting frequency can increase to $f(t_1)=20/10=2$ Hz. As mentioned before, a higher reporting frequency leads to a more accurate monitoring of the power and, therefore, this higher reporting frequency leads to an improved performance of the resource allocation algorithm and consequently also for the communication system.

Figure 4:
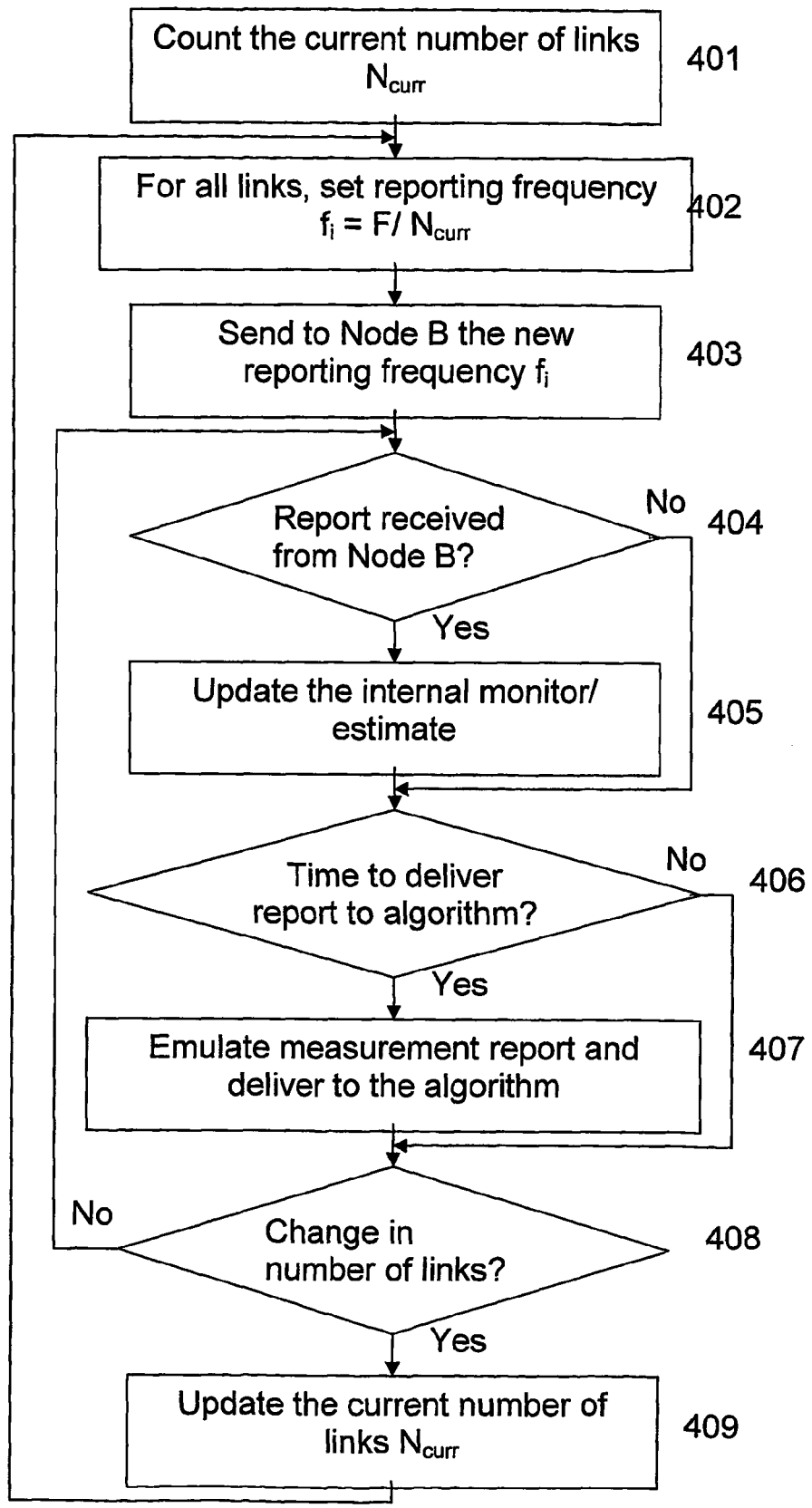
FIG. 4 shows a flow chart describing a method according to an exemplary embodiment of the invention.

The procedure described in the example above is summarised with the help of the flowchart in FIG. 4. The procedure is initialised by counting 401 the number of links, if any, already connected to the NodeB at the moment of inserting the measurement proxy in the system by means of a counter in the measurement proxy. This counter is updated each time a link is added or removed (steps 408 and 409), e.g. at the moment of setting up a new channel, closing a connection or due to terminal mobility (handover). If no link is connected to NodeB when the proxy is inserted, the procedure would start at step 408 when the first link is added to NodeB. Each time a change in the number of links occurs, the reporting frequency for each link measurement report $f_i$ is recalculated for all measurement reports and set (step 402) to $f_i=F/N_{curr}$, where $N_{curr}$ stands for the number of links currently in use. The measurement proxy updates the reporting frequency by sending (step 403) a new dedicated measurement initialisation (i.e. new measurement requests) to NodeB.

When measurement reports are received at step 404 by the measurement proxy from NodeB, the proxy updates (step 405) internal monitors of the dedicated code power measurement reports (one monitor for each link). The measurement reports are kept in these monitors until there is time to deliver a measurement report to the resource allocation algorithm (step 406). Then the measurement proxy emulates 407 the measurement report needed by the resource allocation algorithm and delivers it to the algorithm at the reporting frequency desired by the algorithm (1.25 Hz in this example). The emulation process, which may include e.g. extrapolation is beyond the scope of this invention.

In this example, the reporting frequency is updated by sending new measurement requests for all links each time the number of links change. This may lead to an undesirably high signalling frequency from the RNC to NodeB. Therefore, some changes can be made to reduce the signalling burden. For instance, the updating of the reporting frequency for all links connected to the NodeB can be made only when the aggregate reporting frequency $$\sum f_i$$

exceeds some predefined limits.

Consider now another solution according to a preferred embodiment of the invention, described by using the same architectural set-up as in FIG. 3. However, in this embodiment the procedure performed by the measurement proxy 304 when selecting the reporting frequency over the Iub interface 302 is more advanced since it considers that the importance of the information in the different periodic measurement reports may differ. For example, the importance of different measurement types, wherein one measurement type is defined as one and the same type of measurements, may differ. In the embodiment it is considered that links having high values for a suitable measurement type mv are more important to control than links having low values for the measurement type.

Measurement types where this is applicable could be e.g. link code power or uplink signal to interference ratio error (uplink SIR-error). Consequently, measurement reports containing measurements from links with a high value of the measurement type preferably need a higher reporting frequency than reports containing low values for the same measurement type. Hence, the reporting frequencies are weighted proportionally to the values of the measurement types, such that:

$$w_r = mv_r.$$

When the system only reports measurement reports containing one measurement type and when only one periodic measurement report is sent per link, the frequency of each periodic measurement reports for a link is computed as:

$$f_i = \frac{F * mv_i}{\sum_i mv_i}$$

wherein F defines the total capacity of the control interface. The formula above could be expressed in a broader sense when the reports contain only one measurement type, but when more than one periodic measurement report may be sent per link:

$$f_r = \frac{F * mv_r}{\sum_r mv_r},$$

wherein $f_r$ is the frequency for measurement report r, and $mv_r$ is the measurement value in measurement report r for the only one measurement type.

In the example below, the measurement type $mv_i$ is exemplified by the link code power, $P_{code,i}$. Consequently, as mentioned earlier in the description, links having high code power are considered more important to control than links having low code power, because they contribute to a higher degree to the limited total code power use of the access point. Therefore a higher reporting frequency would be preferable on the links having high code power. Hence, the reporting frequencies are weighted proportionally to the link code power, such that:

$$w_i = P_{code,i}$$

where $P_{code,i}$ is the code power for link i, and consequently:

$$f_i = \frac{F * P_{code,i}}{\sum_i P_{code,i}}.$$

The above criterion can further be refined in order to ensure that the reporting frequency for a link does not get too high or too low according to the formula below:

$$f_i = \min\left\{f_{max}, \max\left\{f_{min}, \frac{\sum_k f_k * P_{code,i}}{\sum_i P_{code,i}}\right\}\right\}$$

The formula states that if the link reporting frequency $f_i$ computed according to $$\frac{\sum_k f_k * P_{code,i}}{\sum_i P_{code,i}}$$

is below a threshold $f_{min}$, a predefined $f_{min}$ will be used as reporting frequency instead of the computed $f_i$. Similarly, if the computed $f_i$ is above a predefined $f_{max}$, the predefined $f_{max}$ will be used instead of the computed value $f_i$. Note that the total aggregate frequency $$\sum_k f_k$$

in this formula may differ from the total interface capacity F.

Figure 5:
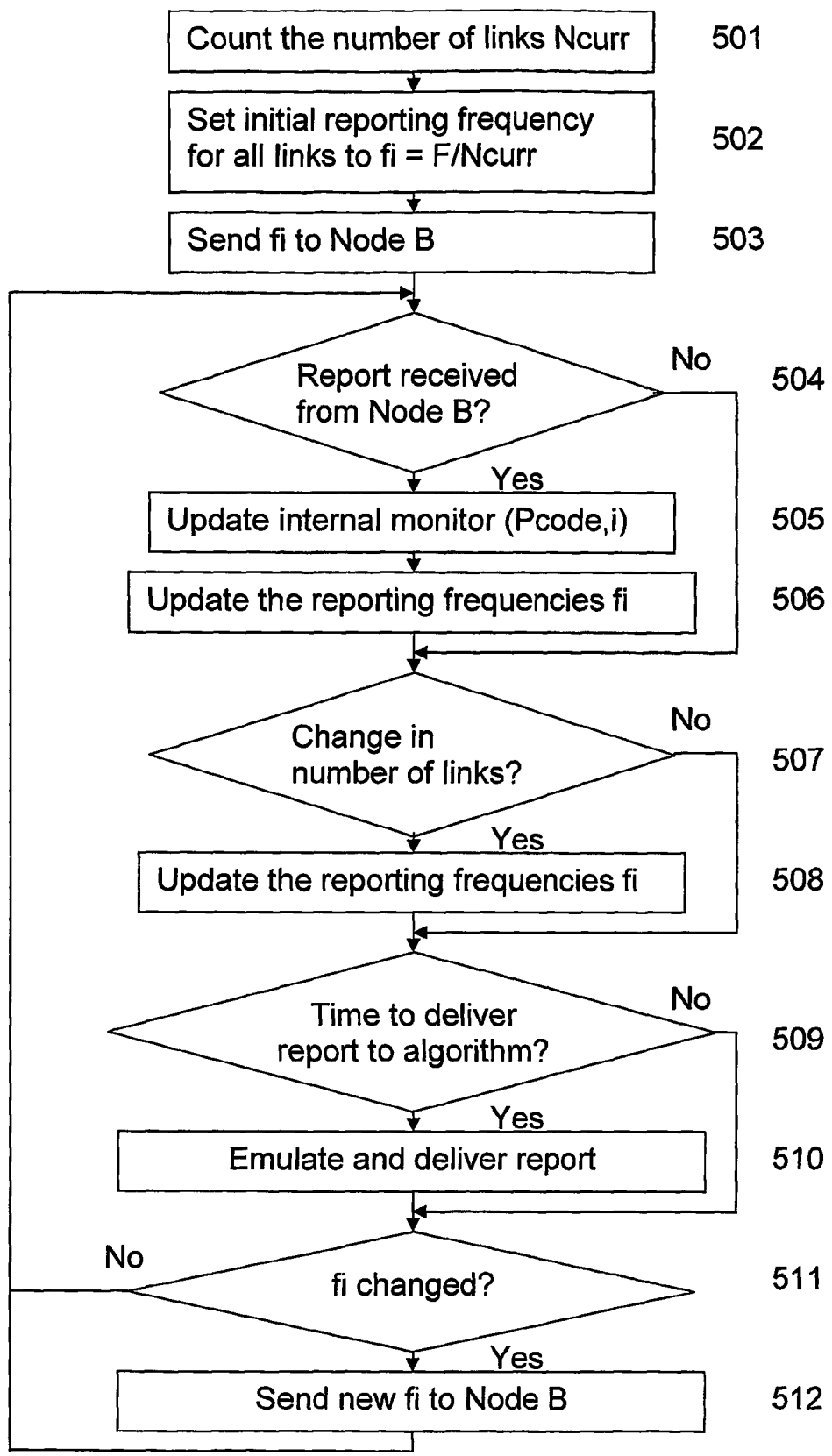
FIG. 5 shows a flowchart describing a method according to another exemplary embodiment of the invention.

The procedure executed by the measurement proxy in this other solution according to a preferred embodiment is summarised by the flowchart in FIG. 5. The first part of the flowchart, i.e. steps 501-503 resembles the initialisation procedure in steps 401-403 of the embodiment described in FIG. 4, and is needed in case the proxy is inserted in the system when there already are some links connected to the NodeB. In contrast to step 402 of FIG. 4, the step 502 of setting the reporting frequencies for all links to the same frequency is only accomplished at an initialisation phase when the link code powers are unknown. If the proxy is inserted when no links are connected to the NodeB, the initialisation part can be skipped. Then the procedure moves to steps 504 and 505, which resembles steps 404 and 405 in FIG. 4. The major difference between the flowchart in FIG. 5 and the flowchart in FIG. 4 lies in the next step 506 where the reporting frequencies are updated depending on whether the relative size of a link code power has changed to a certain degree compared with the code power on the other links, e.g. a link code power has changed above or below a certain threshold. The new frequencies are updated according to the formula $$f_i = \frac{F * P_{code,i}}{\sum_i P_{code,i}}.$$

In the next step 507, which resembles step 408 of FIG. 4, the procedure checks whether there has been any change in the number of links connected to NodeB and in step 508 the reporting frequencies are updated depending on the change and according to the formula $$f_i = \frac{F * P_{code,i}}{\sum_i P_{code,i}}.$$

The change in the number of links can actually be seen as a change in code power as well, in the sense that a new link is associated with a default power value (valid until the first measurement is reported from NodeB), or that the code power of a disconnected link is changed from a former value to 0. Following the step of updating of the reporting frequencies, the proxy checks (step 509) whether there is time to deliver measurement reports from the measurement proxy to the resource allocation algorithm and, if so, the proxy emulates (step 510) and delivers such a report, corresponding to the steps 406 and 407 of FIG. 4. These two steps (406, 407 and 509, 510) are accomplished at different times in the loops in FIGS. 4 and 5, which only shows that the steps could be accomplished at any time within the respective loop. Thereafter, if a reporting frequency has been changed, which is checked in step 511, the proxy signals (step 512) in measurement requests to NodeB the new reporting frequency/frequencies. Thereafter the procedure returns to step 504.

Figure 6:
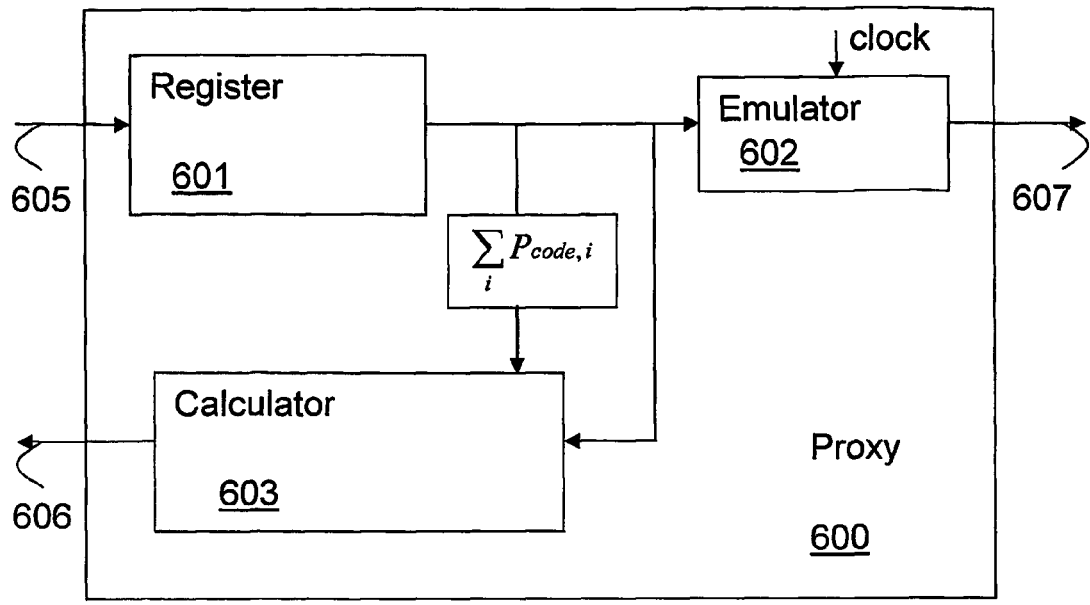
FIG. 6 is a schematic block diagram of a measurement proxy realising a method according to an exemplary embodiment of the invention.

FIG. 6 shows a block diagram of the operation of a measurement proxy 600 according to an embodiment of the invention realising the procedure described in FIG. 5. In this case it is still assumed that only one report per link is sent. Measurement reports are periodically received from the access point over the control interface at an input 605 of the measurement proxy 600. The reporting frequencies over the control interface may change in time according to the settings sent in measurement requests from a first output 606 of the proxy 600 to the access point over the control interface. The measurement reports received from the access point are first stored in a register (monitor) 601. An emulator 602 uses these stored measurement reports to emulate measurement reports to be sent to the resource allocation algorithm in the subunit over the subunit interface from a second output 607 of the proxy 600. Unlike the reporting frequencies over the control interface, which change in time, the reporting frequency for each link over the subunit interface is fixed in time and given exclusively by the reporting frequency per link requested by the algorithm in the subunit. The measurements in the measurement reports stored in the register 601 are also used by a calculator 603 according to the formula $$f_i = \frac{F * P_{code,i}}{\sum_i P_{code,i}},$$

for calculating new reporting frequencies, which are sent to the access point from the first output 606, as described above.

The calculator 603 is, according to a further example of the first preferred embodiment, used for improving the accuracy of the calculated sum of the code power from the different links, $$S = \sum P_{code,i},$$

by assuming that a higher reporting frequency for the links with a large contribution to this sum will lead to a smaller variance of S. More exactly, if measurements of the sum of the link code powers at a certain moment $S(t_1)$ is seen as a prediction of the sum of the link code powers until the next measurement is available at $t_2$, then $D=S(t_2)-S(t_1)$ can be seen as a measure of the prediction error, and the shorter the time interval $d=t_2-t_1$ is, the smaller the prediction error D. Since the time interval d cannot be made arbitrarily small, due to the limitations in the reporting frequencies over the control interface, the prediction error is minimised by reducing this time interval for only some of the reports, namely the reports for the M most representative links:

$$S(t_2) = \sum_{i=1}^{N} P_{code,i}(t_2) \approx \sum_{i=1}^{M<N} P_{code,i}(t_2) + \sum_{i=M_i+1}^{N} P_{code,i}(t_1)$$

The formula shows that the values $P_{code,i}$ for the M most representative links have been updated at $t_2$ (i.e. new reports have been received), whereas the reports for the less representative links are using the old values from $t_1$. Similar realisations of this exemplary embodiment of the invention can be designed in the same spirit.

Figure 7:
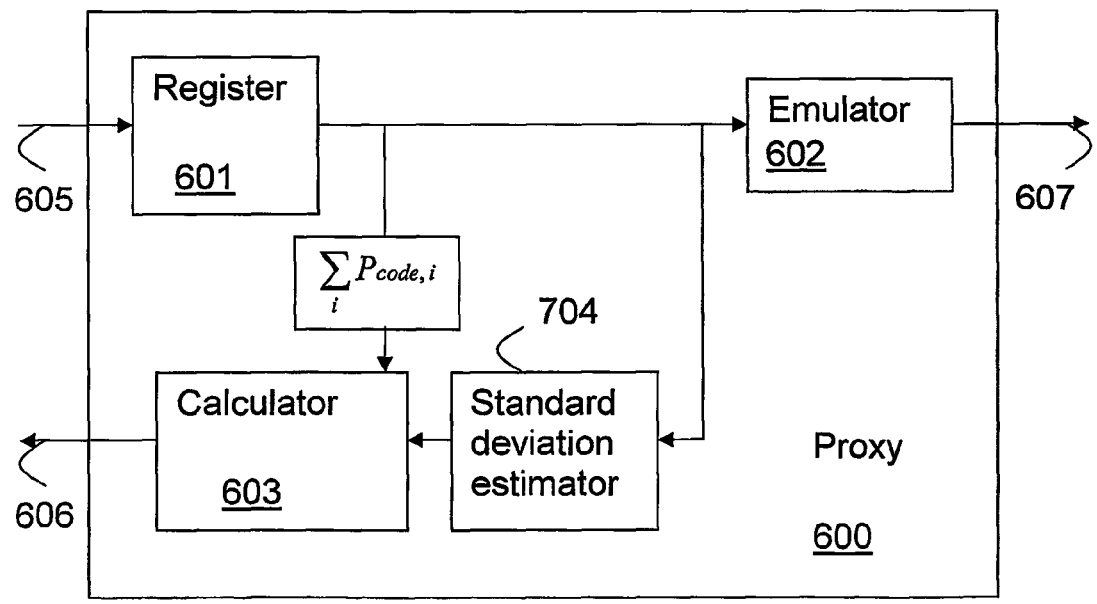
FIG. 7 is a schematic block diagram of an alternative realisation of a measurement proxy according to an exemplary embodiment of the invention.

FIG. 7, wherein like numerals depict like functions as in FIG. 6, shows an embodiment where the weight of each measurement on each link $w_i$ is given by the relative standard deviation of the estimated code power, where the relative standard deviation is given by the estimated code power variation in time and normalised to the total (average) power:

$$w_i = \frac{std(P_{code,i}(t))}{\sum_i P_{code,i}}.$$

As described earlier, it is more important to control and get accurate measurements for links having a large absolute variation in code power than for links having a small variation in code power. This is a consequence of it being important to control the total power used by the active links in a cell or access point for a good total performance of the system, because the total power of an access point is limited due to limited power amplifier resources etc. It is therefore important for the control unit to allocate and reallocate resources so that the total power does not increase too much. The relative standard deviation is estimated in a standard deviation estimator 704 connected between the register 601 and the calculator 603.

In the examples above, the measurement type has been exemplified by the link code power. Although, any suitable measurement type mv could be used for calculating the weighting coefficients and, consequently, the frequencies of the periodic measurement reports. A more general formula for calculating the frequencies for reporting of periodic measurement reports proportional to the standard deviation of measurement values if only one measurement type is reported over the control interface would read:

$$f_r = k * \frac{std(mv_r(t))}{\sum_r mv_r}$$

wherein $f_r$ is the reporting frequency for measurement report r, $mv_r$ is the measurement value in measurement report r, $std(mv_r(t))$ is the standard deviation of the measurement value mv in measurement report r and k is a factor depending on the total capacity of the control interface F and defined such that $$\sum_r f_r \leq F.$$

Figure 8:
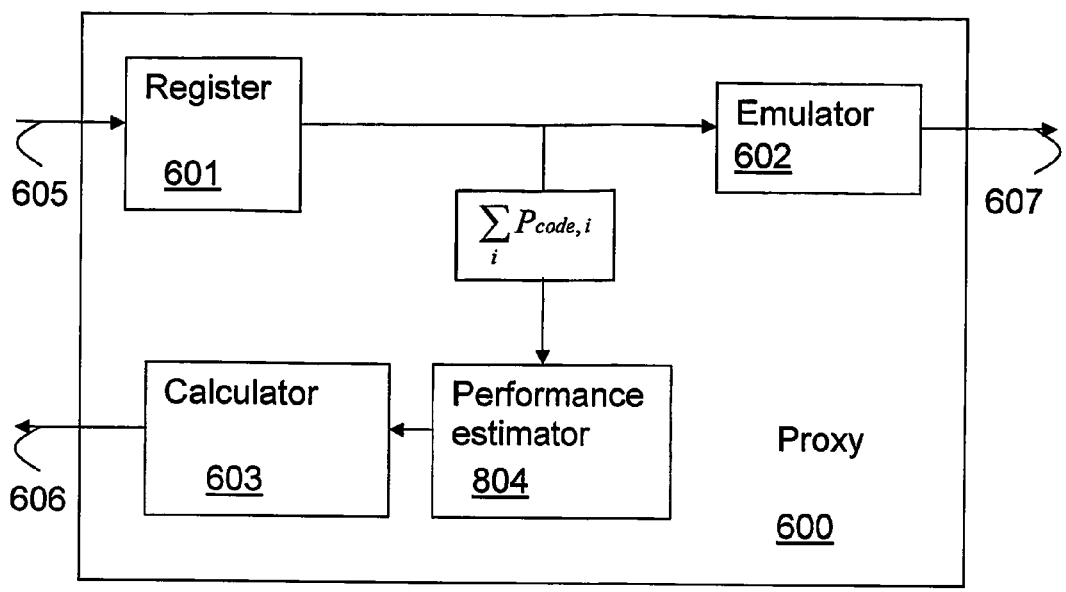
FIG. 8 is a schematic block diagram of another alternative realisation of a measurement proxy according to an exemplary embodiment of the invention.

However, the primarily disclosed idea of changing the reporting frequencies based on information in the received measurement reports of the links currently handled by the access point can be applied in a different way as well. The procedure described above intends to improve the accuracy of the sum of the code power from the different links at a certain time: S(t), i.e. to reduce the prediction error by directly connecting the reporting frequencies to some characteristics of the code power. The alternative procedure is to explicitly use the performance measure for deciding the optimal reporting frequencies. In this case, in the code power example, the sum of the measured code powers of all active links connected to an access point is compared to the carrier power (i.e. the total downlink power of the access point). The reporting frequencies should then be controlled such that the sum of the measured code powers is related to the carrier power. More exactly, the increase (change) of the carrier power should equal the increase (change) in the sum of the measured code powers. This transforms the tuning of the reporting frequencies into an optimisation problem with as many controllable variables as the number of links, as exemplified in the embodiment of a measurement proxy described in FIG. 8, wherein like numerals depict like functions as in FIG. 6. The optimisation problem is solved by a performance estimator 804 in the measurement proxy 600, connected between the register 601 and the calculator 603. The calculator 603 then calculates the reporting frequencies based on the results from the performance estimator 804. The technical solution to the optimisation problem can be any solution known to those skilled in the art of automatic control and is beyond the scope of this application. Nevertheless, the central part of the invention remains the novel idea of dynamically tuning the reporting frequencies.

The examples of the first preferred embodiment described above in connection with FIGS. 3-8 are concerned with scenarios where only one measurement type (in these examples code power measurements) is reported from the access point to the control unit. However, the disclosed idea of dynamically tuning the reporting frequencies for the different measurement reports based on information on the received measurement reports can also be applied in the case where different measurement types are available for each link (connection).

Assume for instance that two different measurements are available for each link. This is shown in the example below for a mobile communication system. In this example, code power measurements could be available regarding the downlink channel of the link (i.e. regarding communication from the access point to the terminal) and the carrier to interference ratio (CIR) could be available regarding the uplink channel of the same link (i.e. regarding communication from the terminal to the access point). It is possible that in certain access point coverage areas, i.e. cells, the downlink channel has limited resources due to radio resource shortage in the cell, in other cells the uplink channel has limited resources while in other cells the uplink and the downlink channels are rather evenly limited. It can be assumed that it is more important to have frequent measurements for the limited channel, while the accuracy requirements are not critical for the non-limited channel, because e.g. the downlink power for each link has to be more accurately controlled if there are limited total downlink power available in the cell, so that the limited total downlink power is not exceeded. Hence, the measurements for a limited channel needs to be reported more frequently as the measurements a the non-limited channel.

According to this embodiment, the same reporting frequency is used in reporting measurements for the downlink channel code power and the uplink channel CIR for the same link if the downlink and the uplink are both limiting factors. The downlink code power measurements, are reported at double frequency than the uplink CIR measurements, if the downlink is the limiting factor. The uplink CIR measurements are reported at double frequency than the downlink code power measurements if the uplink is the limiting factor:

$f_{uplink,i}=f_{downlink,i}$ if both channels are limited $f_{downlink,i}=2*f_{uplink,i}$ if downlink channel is limited $f_{uplink,i}=2*f_{downlink,i}$ if uplink channel is limited The three formulas above may be expressed more generally as:

$f_{uplink,i}=k*f_{downlink,i}$ where k=1 if both channels are limited, k<1 if downlink channel is limited and k>1 if uplink channel is limited.

The computation of the reporting frequencies can for example be done along the lines shown in the previous embodiments. Although, other combinations within the scope of the invention can be performed as well, e.g. combining the importance of a measurement type with the importance of an individual link compared to the other links.

In communication systems it may happen that different subunits (or resource allocation algorithms) in the control unit may require the same measurements from the access point. For example two different resource allocation algorithms may require code power measurements for the same link. For a mobile communication system, an example of two such algorithms is an algorithm for power balancing of users being in soft handover and an algorithm for congestion control. In this case, according to another preferred embodiment of the invention, the system could utilise the control interface more efficiently by coordinating the requests from the algorithms such that only one common measurement request and consequently only one common measurement report for both algorithms is sent over the control interface. Reports are then emulated in the control unit and sent over the subunit interface towards the two algorithms based on the common measurement report sent by the access point. Thereby, control interface capacity could be spared without compromising with the quality of the measurement reports.

Figure 9:
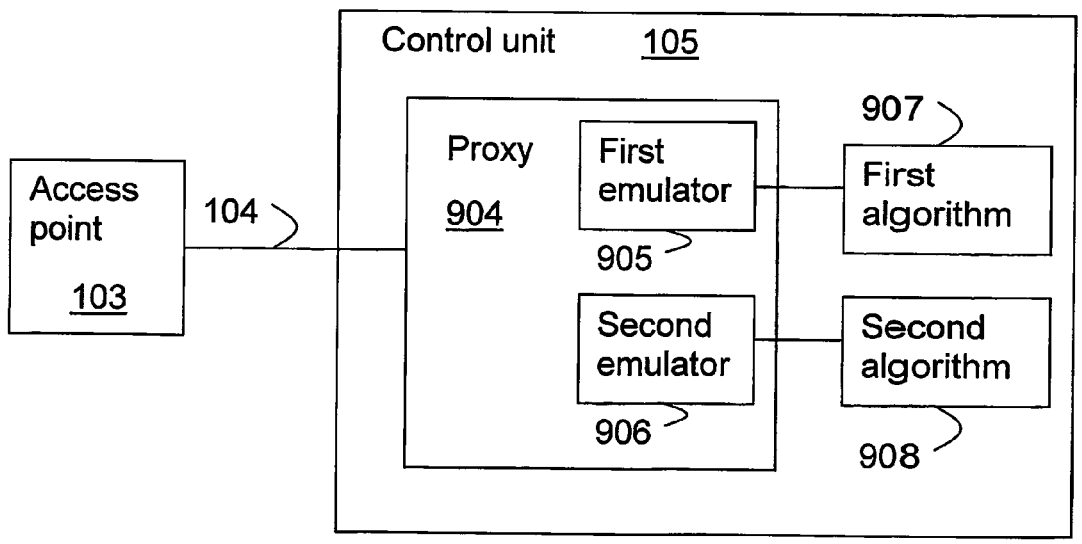
FIG. 9 shows a schematic block diagram of an alternative embodiment of the present invention incorporating a proxy in the control unit for realizing the invention in a communication system.

The procedure according to this embodiment is exemplified according to FIG. 9. According to the embodiment a first algorithm 907 in a control unit 105 requests from a proxy 904 in the control unit 105 code power measurement reports with a frequency $f_{A,i}$ and low pass filtered with a filter $H_A(z)$. Similarly, assume that a second algorithm 908 in the control unit 903 requests from the proxy 904 code power measurement reports for the same link with a frequency $f_{B,i}$ and low pass filtered with a filter $H_B(z)$. Instead of requesting measurement reports from the access point 103 over the control interface 104 separately for both algorithms, i.e. with the higher frequency $f_i=f_{A,i}+f_{B,i}$, the measurement proxy 904 could request only one periodic measurement report with the reporting frequency $f_{0,i}=\max(f_{A,i}, f_{B,i})$ and low pass filtered with a filter $H_0(z)$ such that:

$H_A(z)=H_0(z)*H_A'(z)$ and $H_B(z)=H_0(z)*H_B'(z)$.

The measurement proxy 904 will then emulate in respective first and second emulators 905, 906 measurement reports with the accuracy and reporting frequency desired by the two respective algorithms 907, 908. In order to achieve the desired accuracy, the proxy might need to employ some additional filters in order to emulate the transfer functions $H_A'(z)$ and $H_B'(Z)$, respectively.

All embodiments and examples of embodiments described in the above assume that the total capacity of the control interface, i.e. the aggregate maximum reporting frequency over the control interface, is known to the control unit. For example, the operator of the control unit (e.g. the operator of the RNC in a UTRAN) could know the capabilities of each individual access point and each control interface and can therefore configure the measurement proxy for each access point and control interface. However, other approaches can be used as well. For instance, a specific protocol could be designed so that the measurement proxy can inquire the access point for the capabilities of the control interface. Another alternative is for the measurement proxy to test the control interface in an initialisation phase. For instance, the proxy can start by assuming a small figure for the aggregate reporting frequency F over the control interface, and then gradually increase the frequency until the total interface capacity is reached. If the access point responds by sending measurement reports at the requested aggregate frequency, then the measurement proxy can estimate that the capacity of the interface is at least as large as the requested aggregate frequency. This procedure can then be repeated until the access point cannot respond as expected any longer, either by failing to increase the reporting frequency, by ceasing to send reports for some links, or by becoming unstable in any other sense.

As shown in the application, the object of the invention is to control the measurement reporting from the access point to the control unit over the control interface such that the limited total capacity over the control interface is efficiently used for the purpose of achieving a good control of the resource allocation at the access point. This is achieved by dynamically determining a frequency for periodical reporting of each periodic measurement report from the access point to the control unit based on information on the number of links currently handled by the access point and such that a total aggregate frequency of periodical reporting of the number of periodic measurement reports does not exceed the limited total capacity of the control interface.

In comparison, the solution in the earlier mentioned international patent application WO 02/73887 detects a high load of a processor or an interface compared to the capacity of the processor or the interface and adjusts the load of the air interface by decreasing the frequency for some reports for the links and by checking whether this decrease was enough to avoid exceeding the capacity of the processor or the interface. A drawback with this solution is that several iterations of decreasing and checking operations may be required until suitable frequencies are determined for all reports. The solution according to the present invention determines suitable reporting frequencies with regard to the limitations of the control interface and with regard to information on the links currently handled by the access point, which allows for instant determination of suitable reporting frequencies for all requested periodic reports taking into account the total capacity of the interface. Thereby, the control interface is more efficiently used and the system performance is increased.

In the drawings and specification, there have been disclosed preferred embodiments and examples of the invention and, although specific terms are employed, they are used in a generic and descriptive sense only and not for purposes of limitation, the scope of the invention being set forth in the following claims.

The invention claimed is:

1. A method in a communication system, comprising the steps of:

a control unit requesting from an access point a number of periodic measurement reports regarding a number of links handled by the access point; receiving at the control unit said requested number of periodic measurement reports from the access point over a control interface connecting said control unit with said access point and having a limited total capacity for forwarding measurement reports; and determining dynamically a frequency for periodical reporting of each periodic measurement report from the access point to the control unit based on information on said number of links currently handled by the access point and such that a total aggregate frequency of periodical reporting of said number of periodic measurement reports does not exceed said limited total capacity of the control interface, wherein the step of determining the frequencies for periodical reporting of each periodic measurement report is accomplished according to the formula $f_r = k^* w_r$, wherein $f_r$ denotes the frequency for periodic measurement report r, $w_r$ denotes a weighting coefficient defining a priority for the periodic measurement report r, k is a factor dynamically determined as:

$$k \leq \frac{F}{\sum_r w_r}$$

and F is the limited total capacity of the control interface expressed in reports per second.

2. The method according to claim 1 wherein the step of determining the frequency for periodical reporting of each periodic measurement report includes the step of supervising the total number of links currently handled by the access point;

wherein the step of determining the frequencies for periodical reporting of each periodic measurement report is accomplished according to the formula $f_r = k^* w_r$, wherein $f_r$ denotes the frequency for periodic measurement report r, $w_r$ denotes a weighting coefficient defining a priority for the periodic measurement report r, k is a factor dynamically determined as:

$$k \leq \frac{F}{\sum_r w_r}$$

and F is the limited total capacity of the control interface expressed in reports per second.

3. The method according to claim 1 wherein the frequency determined for periodical reporting of a periodic measurement report depends on a measurement type of the periodic measurement report.

4. The method according to claim 3 wherein the frequency determined for periodical reporting of the periodic measurement report depends on the importance of said measurement type with regard to the performance of the communication system.

5. The method according to claim 1 wherein the frequency determined for periodical reporting of a periodic measurement report depends on information on a measurement value in a periodic measurement report.

6. The method according to claim 5 wherein said number of periodic measurement reports have one and the same measurement type and wherein the frequency for periodical reporting of each periodic measurement report is determined according to the formula $$f_r = F * \frac{mv_r}{\sum_r mv_r}$$

wherein $f_r$ denotes the frequency of periodic measurement report r, F denotes the limited total capacity of the control interface and $mv_r$ denotes the measurement value of periodic measurement report r.

7. The method according to claim 5 wherein said number of periodic measurement reports have one and the same measurement type and wherein the frequency for periodical reporting of each periodic measurement report is determined according to the formula $$f_r = k * \frac{std(mv_r(t))}{\sum_r mv_r}$$

wherein $f_r$ denotes the frequency of periodic measurement report r, $mv_r$ denotes the measurement value of periodic measurement report r, $std(mv_r(t))$ is the relative standard deviation of the measurement value of periodic measurement report r and wherein k is a factor defined such that $$\sum_r f_r \leq F$$

wherein F is the limited total capacity of the control interface.

8. The method according to claim 1 wherein the step of determining the frequency for periodical reporting of each periodic measurement report is accomplished according to the formula f=F/N, wherein f is the frequency for each periodic measurement report, F is the limited total capacity of the control interface expressed in reports per second and N is the current number of requested periodic measurement reports.

9. The method according to claim 1 further comprising the step of:
updating the frequency for periodical reporting of each periodic measurement report from the access point to the control unit in response to a link being added to or removed from said number of links handled by the access point.

10. The method according to claim 1 further comprising the step of:
updating the frequency for periodical reporting of each periodic measurement report from the access point to the control unit in response to a measurement value for a link being modified.

11. The method according to claim 1 wherein said number of periodic measurement reports are received by a measurement proxy in the control unit from the access point over the control interface at the determined frequencies for periodical reporting of said number of periodic measurement reports, and wherein the measurement proxy emulates and delivers the received number of periodic measurement reports to at least one subunit in the control unit at frequencies requested by the at least one subunit, and wherein the determined frequencies for periodical reporting can differ from the frequencies requested by the at least one subunit.

12. The method according to claim 11 wherein the measurement proxy coordinates at least two requests from at least two subunits for periodic measurement reports of the same measurement type and regarding the same link into a single request for a periodic measurement report from the access point.

13. The method according to claim 1 wherein the limited total control interface capacity for forwarding measurement reports is detected by the control unit through testing of the control interface in an initialisation phase, wherein the control unit requests periodic measurement reports at a gradually increasing frequency until the total control interface capacity is reached.

14. A communication system comprising:
an access point handling a number of links;
a control unit for controlling resource allocation at the access point, wherein the control unit is arranged to request from the access point a number of periodic measurement reports regarding said number of links handled by the access point;
a control interface for connecting said control unit with said access point and having a limited total capacity for forwarding measurement reports to the control unit from the access point,
wherein the system is arranged to dynamically determine a frequency for periodical reporting of each periodic measurement report from the access point to the control unit based on information on said number of links currently handled by the access point and such that a total aggregate frequency of periodical reporting of said number of periodic measurement reports does not exceed said limited total capacity of the control interface, and
wherein the system is arranged to determine the frequency for periodical reporting of each periodic measurement report according to the formula $f_r = k * w_r$, wherein $f_r$ denotes the frequency for periodic measurement report r, $w_r$ denotes a weighting coefficient defining a priority for the periodic measurement report r, k is a factor dynamically determined as:

$$k \leq \frac{F}{\sum_r w_r}$$

and F is the limited total capacity of the control interface expressed in reports per second.

15. The communication system according to claim 14 wherein the system further includes means for supervising the total number of links currently handled by the access point.

16. The communication system according to claim 14 wherein the system is arranged to determine the frequency for periodical reporting of a periodic measurement report such that it depends on a measurement type of the periodic measurement report.

17. The communication system according to claim 16 wherein the system is arranged to determine the frequency for periodical reporting of a periodic measurement report such that it depends on the importance of said measurement type with regard to the performance of the communication system.

18. The communication system according to claim 14 wherein the system is arranged to determine the frequency for periodical reporting of a periodic measurement report such that it depends on information on a measurement value in the periodic measurement report.

19. The communication system according to claim 18 wherein the system is arranged to request periodic measurement reports having one and the same measurement type and wherein the system is further arranged to determine the frequency for periodical reporting of each periodic measurement report according to the formula $$f_r = \frac{F * mv_r}{\sum_r mv_r}$$

wherein $f_r$ denotes the frequency of periodic measurement report r, F denotes the limited total capacity of the control interface and $mv_r$ denotes the measurement value of periodic measurement report r.

20. The communication system according to claim 18 wherein the system is arranged to request periodic measurement reports having one and the same measurement type and wherein the system is further arranged to determine the frequency for periodical reporting of each periodic measurement report according to the formula $$f_r = k * \frac{std(mv_r(t))}{\sum_r mv_r}$$

wherein $f_r$ denotes the frequency of periodic measurement report r, $mv_r$ denotes the measurement value of periodic measurement report r, $std(mv_r(t))$ is the relative standard deviation of the measurement value of periodic measurement report r and wherein k is a factor defined such that $$\sum_r f_r \leq F$$

wherein F is the limited total capacity of the control interface.

21. The communication system according to claim 14 wherein the system is further arranged to determine the frequency for periodical reporting of each periodic measurement report according to the formula f=F/N, wherein f is the frequency for each periodic measurement report, F is the limited total capacity of the control interface expressed in reports per second and N is the current number of requested periodic measurement reports.

22. The communication system according to claim 14 wherein the system furthermore is arranged to update the frequency for periodical reporting of each periodic measurement report from the access point to the control unit in response to a link being added to or removed from said number of links handled by the access point.

23. The communication system according to claim 14 wherein the system furthermore is arranged to update the frequency for periodical reporting of each periodic measurement report from the access point to the control unit in response to a measurement value for a link being modified.

24. The communication system according to claim 14 wherein the control unit further comprises
   a measurement proxy for receiving said number of periodic measurement reports from the access point over the control interface at the determined frequencies for periodical reporting of said number of periodic measurement reports; and
   at least one subunit for requesting a periodic measurement report at a requested frequency,
   wherein the measurement proxy is arranged to emulate and deliver a received periodic measurement report to the at least one subunit at the requested frequency and wherein a determined frequency for periodical reporting of the received measurement report can differ from the frequency requested by the at least one subunit.

25. The communication system according to claim 24 wherein the measurement proxy is further arranged to coordinate at least two requests from at least two subunits for periodic measurement reports of the same measurement type and regarding the same link into a single request for a periodic measurement report from the access point.

26. The communication system according to claim 14 wherein the control unit furthermore is arranged to detect the limited total control interface capacity for forwarding measurement reports through testing of the control interface in an initialisation phase, wherein the control unit requests periodic measurement reports at a gradually increasing frequency until the total control interface capacity is reached.

27. The communication system according to claim 14 wherein the access point is arranged to dynamically determine the frequency for periodical reporting of each periodic measurement report from the access point to the control unit.

28. A computer-readable storage medium storing computer software which when executed by a control unit cause the control unit to perform the method according to claim 1 when executed.

29. A control unit arranged to perform the method according to claim 1.

* * * * *

UNITED STATES PATENT AND TRADEMARK OFFICE
CERTIFICATE OF CORRECTION

PATENT NO. : 7,580,362 B2 Page 1 of 1
APPLICATION NO. : 10/572372
DATED : August 25, 2009
INVENTOR(S) : Timus It is certified that error appears in the above-identified patent and that said Letters Patent is hereby corrected as shown below:

Title Page, Item (54), after "IN" insert -- A --.

In Column 1, Line 2, after "IN" insert -- A --.

Signed and Sealed this

Nineteenth Day of January, 2010

David J. Kappos
*Director of the United States Patent and Trademark Office*